United States Patent
Ohta et al.

(10) Patent No.: US 7,532,356 B2
(45) Date of Patent: May 12, 2009

(54) MANAGEMENT OF PRINT SYSTEM BASED ON PRINTING PREPARATION AND TRANSFER TIME

(75) Inventors: Yasunori Ohta, Kaisei-machi (JP); Tomohiko Ito, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 1000 days.

(21) Appl. No.: 10/775,188

(22) Filed: Feb. 11, 2004

(65) Prior Publication Data

US 2004/0156057 A1   Aug. 12, 2004

(30) Foreign Application Priority Data

Feb. 12, 2003   (JP)  ............................. 2003-033251

(51) Int. Cl.
   *H04N 1/00*   (2006.01)
(52) U.S. Cl. ...................... 358/1.6; 358/1.15; 358/498; 399/361; 399/367; 399/379; 271/3.14; 271/8.1; 271/10.01
(58) Field of Classification Search .................. 358/1.6, 358/1.15, 498; 399/361, 367, 379; 271/10.01, 271/3.14, 8.1
   See application file for complete search history.

(56) References Cited

U.S. PATENT DOCUMENTS

2001/0022660 A1 * 9/2001 Toyofuku .................. 358/1.6

FOREIGN PATENT DOCUMENTS

| JP | 7-141276 | A |   | 6/1995 |
|----|----------|---|---|--------|
| JP | 10-058798 |   |   | 3/1998 |
| JP | 10058798 | A | * | 3/1998 |
| JP | 2000-238386 |   |   | 9/2000 |
| JP | 2002-351167 | A |   | 12/2002 |

* cited by examiner

*Primary Examiner*—Twyler L Haskins
*Assistant Examiner*—Jacky X Zheng
(74) *Attorney, Agent, or Firm*—Sughrue Mion, PLLC

(57) ABSTRACT

A print system capable of printing more quickly, printing and observing images more in the order of completion of transfer of the image data, and also reducing the generation of waste of recording sheets even in a case that printing of the image is canceled in the middle of the image printing, compared with the conventional method. In the system including at least two image data outputting apparatuses and one printer for printing images based on the image data transferred from the at least two image data outputting apparatuses, when the image data is transferred from each image data outputting apparatuses, the printing preparation of the recording sheet is started at a timing so that it is completed upon completion of the image data transfer, based on the time required for transfer of the image data and printing preparation time required for the printing preparation of the recording sheet.

6 Claims, 3 Drawing Sheets

MANAGEMENT OF PRINT SYSTEM BASED ON PRINTING PREPARATION AND TRANSFER TIME

BACKGROUND OF THE INVENTION

1. Field of the Invention

The present invention relates to a print system for printing images by a printer to which at least two image data outputting apparatuses are connected and image data is transferred from each of the image data outputting apparatuses.

2. Description of the Related Art

Conventionally, for example, as described in Japanese Unexamined Patent Publication No. 7 (1995)-141276, a print system which prints images by transferring image data from each of a plurality of image data outputting apparatuses which have been connected to one printer is known.

In the conventional print system having such a plurality of image data outputting apparatuses connected to one printer, the following two methods are used as printing methods of the image data transferred from each image data outputting apparatus.

One is a method in which when the image data is transferred from each image data outputting apparatus, printing preparation of a recording sheet such as a film and a recording paper for printing the image data is started upon completion of the transfer of the image data. Specifically, the recording sheet of a print size (output size) of the image data is fed from a tray and carried to a printing unit, and after the printing preparation of the recording sheet is completed, printing is performed. The other is a method in which at the start of the transfer of the image data, printing preparation of the recording sheet having a print size of the image data is started, completion of the transfer of the image data is awaited, and then the printing operation is performed.

In either one of the above-described methods, printing preparation start timing of the recording sheet is fixed, and in the image data transfer from any one of the image data outputting apparatuses, in the former method, the printing preparation of the recording sheet is always performed upon completion of transfer of the image data. Meanwhile, in the latter method, the printing preparation of the recording sheet is always performed when transfer of the image data is started.

In the former method, the printing preparation is always started after transferring of the image data is complete. This enables printing of the image data in the order of completing transfer of the data and also enables observation of the images in this order. However, since the printing preparation of the recording sheet is performed after transferring of the image data is completed, there is a problem in that the start of the printing is delayed by the recording sheet being prepared. Therefore, the observation timing of the images is delayed in comparison with a case where the printing is initiated immediately after the transfer of the image data.

In the latter method, at the time when transfer of the image data is started, the printing preparation of the recording sheet is started. Therefore, the printing preparation of the recording sheet and transfer of the image data can be performed simultaneously, and printing is started immediately after the completion of transfer of the image data. Although this makes it possible to observe the images earlier, this also causes a problem that the images can not be printed and observed in the order that the image data had been transferred. That is, generally, transfer time of the image data is varied among each image data outputting apparatus and the print size of each image data is also different in many cases. For example, if transfer of image data from a device having a long transfer time is previously started, the printing preparation of the recording sheet of a print size of the image data is started at the start of the transfer. Hence, when transfer of the image data is started from a device having a short transfer time and its transfer is completed earlier than the previous one, printing of the latter image data can not be performed. This is because the printing preparation of the recording sheet of the print size of the former image data which has been previously transferred is already performed. Therefore printing of the latter data cannot be performed until after transfer and printing of the former image data is completed, even if transfer of the latter image data has been previously completed. As a result, although the transfer of the latter image data has been previously completed, printing and observation of the image cannot be performed, until printing of the former image data, for which transfer is completed later, is finished.

Moreover, in the latter method in which printing preparation of the recording sheet is started at the start of transfer of the image data, if the printing of the image data is canceled after starting transfer of the image data and the print size of the canceled image data and the print size of the following image data are different from each other, the prepared recording sheet is not applied for printing and is discharged from the printer to prepare the recording sheet having the print size of the next image data to be printed thereon. This is a waste of the prepared recording sheet.

SUMMARY OF THE INVENTION

In view of the above-described problems, an object of the present invention is to provide a print system capable of printing more quickly in general, capable of printing and observing images in the order that the image data are transferred as much as possible, and also capable of restricting the generation of waste of a recording sheet even in a case that image printing is canceled in the middle of the image printing in comparison with the conventional method.

In order to achieve the above-described object, the printer system according to the present invention includes:

at least two image data outputting apparatuses and one printer that prints images based on image data transferred from the at least two image data outputting apparatuses; and control means that controls printing preparation of the recording sheet in the printer based on the transfer time, required for the transfer of the image data when the image data is transferred from each image data outputting apparatus, and a printing preparation time required for printing preparation of the recording sheet for printing the images based on the image data; wherein printing preparation start timing is obtained that enables the time of completion of transfer of the image data and the time of completion of the printing preparation of the recording sheet to be synchronized; and the printing preparation of the recording sheet is started at the above-described printing preparation start timing.

A configuration may be adopted wherein:

the transfer time is calculated and obtained by the control means based on information sent from the image data outputting apparatus when the image data is transferred from each image data outputting apparatus.

A configuration may also be adopted wherein:

transfer time information indicating the transfer time of the image data of the image data outputting apparatus is input and stored beforehand in the control means.

A configuration may further be adopted wherein:

the control means obtains a difference time between the transfer time and the printing preparation time; and in the case that the transfer time is longer than the printing preparation time, printing preparation of the recording sheet is started after a period of time equivalent to the difference time from the start of image data transfer.

The above-described "image data outputting apparatus" may be formed in any way, as long as the device outputs the image data to be printed and transfers the image data to the printer. However, devices for outputting medical image data showing medical images such as a device that outputs the image data read from a stimulable phosphor sheet having radiographic images recorded in a CR device, and a device that outputs the image data obtained by a CT scanner are exemplified as examples of the image data outputting apparatus.

In addition, the above-described "transfer time" is a time required for transferring the image data and refers to the time from the start of the transfer to the completion thereof. Generally, the transfer time can be obtained based on the transfer speed and the image size (numbers of pixels/number of image data).

Moreover, the above-described "printing preparation of the recording sheet" means that the recording sheets such as various kinds of films or recording papers are made into a state where they can be printed and, the recording sheet of a suitable size and/or kind for printing is, for example, taken out from a tray or the like and conveyed to a print unit.

In addition, the above-described "enables the time of completion of transfer of the image data and the time of completion of the printing preparation of the recording sheet to be synchronized" is not limited to the case where the time of completion of the transfer of the image data and the time of completing the printing preparation of the recording sheet are completely matched. This includes the case where the time of completion of the transfer of the image data and the time of completion of the printing preparation are in a state of a given time relationship, for example, the time relationship of the former to the latter is a predetermined time before or a predetermined time after.

In the print system according to the present invention, as described above, when the image data is transferred from each image data outputting apparatus, the printing preparation of the recording sheet is started at the timing by which the printing preparation of the recording sheet is completed upon completion of the transfer of the image data, based on the transfer time of the image data and the printing preparation time of the recording sheet. Therefore, the printing operation can be started basically at the same time the transfer is complete, for each of the image data. This enables observation of the images immediately after transfer and observation of the images in the order of completion of transfer. Further, on the condition that the printing preparation of the recording sheet is completed when transfer of the image data is completed, the printing preparation of the recording sheet is started at the latest timing. Therefore, even if printing is canceled after transfer is started, cases in which the printing preparation of the recording sheet is not yet started are increased. Thus, waste of the recording sheet due to canceling can be suppressed.

DESCRIPTION OF THE PREFERRED EMBODIMENTS

The preferred embodiments of the present invention will be explained in detail with reference to the drawings.

Figure 1:
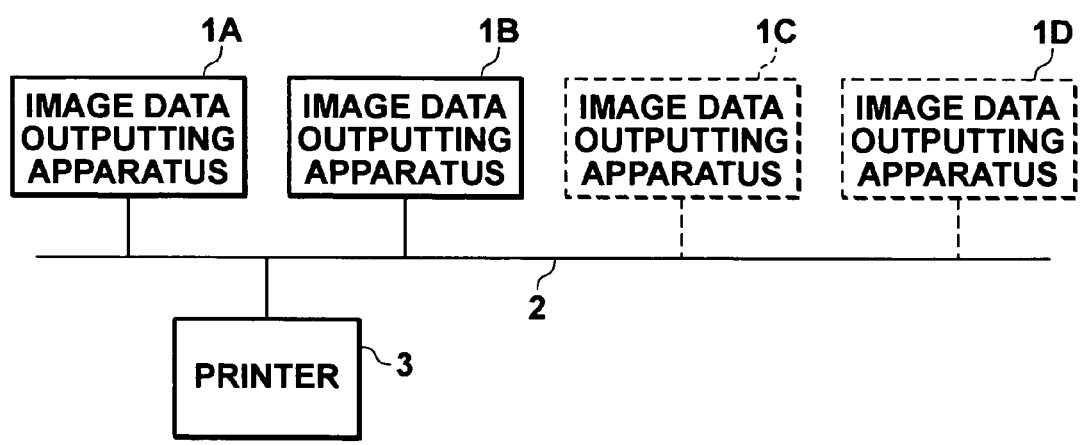
FIG. 1 is a schematic view showing a print system according to the present invention.
Figure 2:
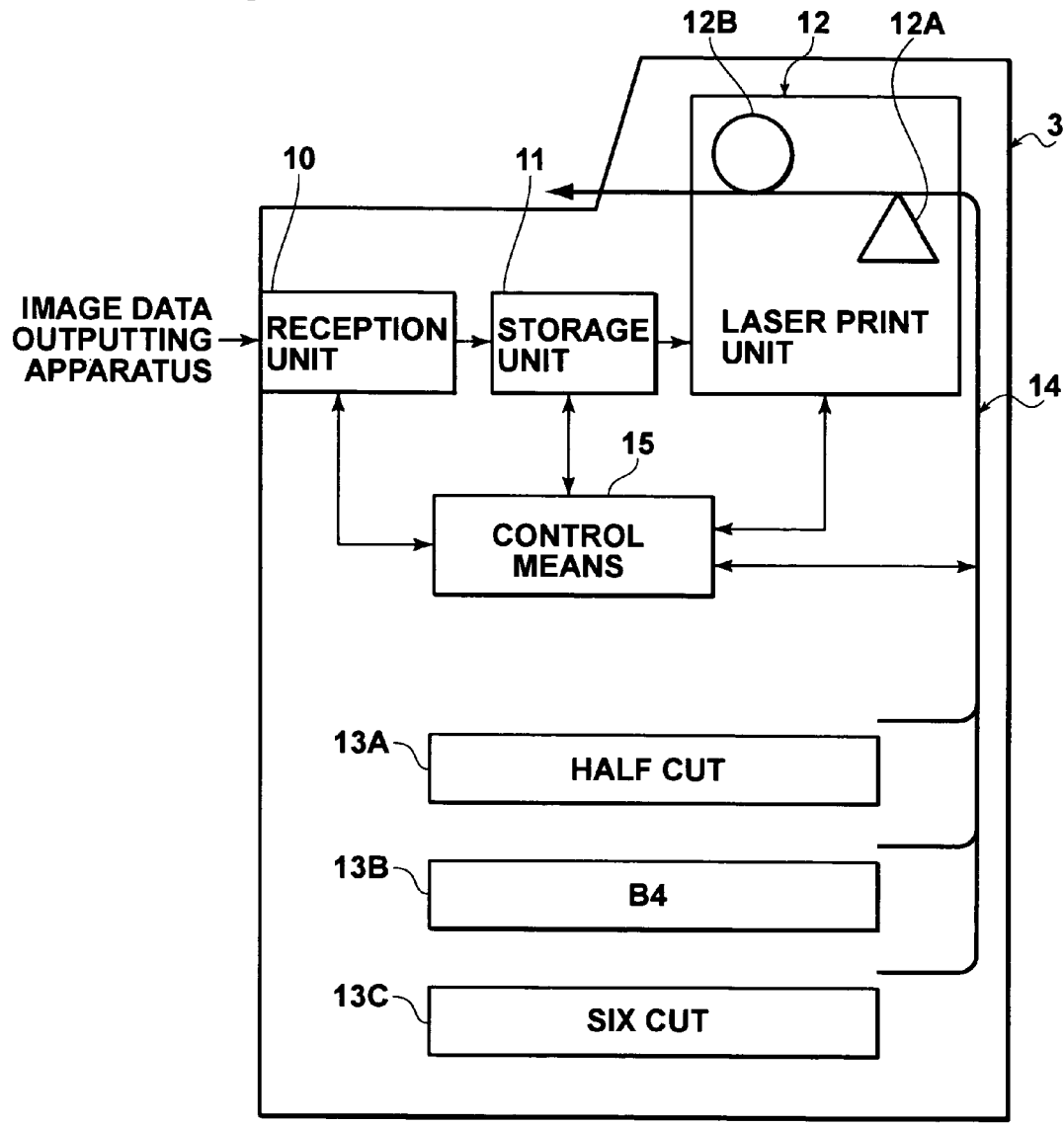
FIG. 2 is a block diagram showing a printer shown in FIG. 1.

FIG. 1 is a schematic view showing an embodiment of a print system according to the present invention, and FIG. 2 is a block diagram showing a printer shown in FIG. 1.

The print system shown in FIG. 1 is constituted by two image data outputting apparatuses 1A and 1B, and one printer 3 connected to the two image data outputting apparatuses 1A and 1B through a network 2.

The image data outputting apparatus 1A is a CR image data outputting apparatus. Image data is obtained by scanning a stimulable phosphor sheet in which radiation images of the subject recorded with an excitation light, and by photoelectrically reading a photo stimulable luminescent light emitted from the stimulable phosphor sheet. Meanwhile, the image data outputting apparatus 1B is a CT image data outputting apparatus for outputting tomographic image data of the subject obtained by a CT scanner.

The printer 3 is a laser printer. The printer 3 includes: a reception unit 10 for receiving the image data transferred from each of the image data outputting apparatuses 1A and 1B; a storage unit 11 for storing the image data received by the reception unit 10; a laser print unit 12 for laser printing the image carried by the image data on a film, which is one example of a recording sheet, based on the image data stored in the storage unit 11; three trays 13A, 13B, and 13c for storing films of three sizes, that is, 14" by 17" film, B4 (10" by 14") size film, and 8" by 10" film, respectively; a feeder 14 for feeding the film from each tray 13A, 13B, and 13C, and conveying it to the laser print unit 12; and control means 15 for controlling the reception unit 10, storage unit 11, laser print unit 12 and the feeder 14.

The laser print unit 12 has a laser irradiation section 12A for irradiating a laser beam in accordance with the image data and a heater section 12B for heating and developing the film irradiated with the laser beam.

The control means 15 controls the printing preparation and printing operation of the film in the printer 3 based on the transfer of image data from each of the image data outputting apparatuses 1A and 1B. Hereafter, control of the printing preparation and printing operation of a film by the control means 15 will be explained.

When the image data is transferred from either/both of image data outputting apparatuses 1A and 1B, preparation communication for enabling transfer of image data from the image data outputting apparatus 1A and 1B is performed first. Receiving the preparation communication, the printer 3 becomes capable of receiving the image data, and thereafter the image data is transferred from either/both of the image data outputting apparatuses 1A and 1B. The preparation communication includes information such as: identification information of the image data outputting apparatuses (information indicating which of the image data outputting apparatuses 1A or 1B); image size information indicating the image size, which is the number of data (the number of pixels) of the image data to be transferred; transferring speed information indicating the transferring speed (MB/S) of transfer; and print size information indicating the print size of the image data to be transferred. In addition, when a plurality of images are printed on one film, the image size information includes information indicating the number of images (the number of frames) per one film and the image size of each image. In such a case, sum of the image sizes of each image is the image size of the image data.

First, when the preparation communication is sent from either/both of the image data outputting apparatuses 1A and 1B, the preparation communication is received by the reception unit 10 and inputted in the control means 15. The control means 15 controls the reception unit 10 and the storage unit 11 to place them in a state capable of receiving and storing the image data transferred thereafter. Then, when the image data is transferred, the reception unit 10 is caused to receive it and the storage unit 11 is caused to store it. In addition, based on various information sent from the image data outputting apparatus in the preparation communication, the control means 15 obtains the transfer time required for transfer of the image data and the printing preparation time of the film for printing the image based on the image data.

The transfer time is obtained by the product of the number of the image data and the transfer speed (the number of image data×transfer speed), based on the transfer speed information and the image size information sent from the image data outputting apparatus. When the transfer speed information is not sent from the image data outputting apparatus, the transfer time can be obtained by the following two methods. One is a method in which when the transfer speed of each image data outputting apparatus is known, the transfer speed information indicating the transfer speed of each image data outputting apparatus is inputted and stored in the control means 15 beforehand. Then, the image data outputting apparatus is recognized by the identification information sent therefrom (recognizing which of the image data outputting apparatuses 1A and 1B), and the transfer speed of the image data outputting apparatus is obtained from the stored transfer speed information. Then, by the product of the transfer speed and the number of image data sent from the image data outputting apparatus, the transfer time is obtained. The other is a method in which when information of the transfer speed of the image data outputting apparatus is not stored in the control means 15, a default transfer speed stored in the control means 15 beforehand is used.

Note that when transfer of the image data from the image data outputting apparatus is started, if information indicating the transfer time is sent, the transfer time can be obtained based on the information.

The printing preparation time of the film is the time required for printing preparation of the film. In this embodiment, it is the time required to feed the films which are applied for printing from the trays 13A, 13B, and 13C, and conveying the films to a point before the laser print unit 12. The printing preparation time may be obtained, for example, as follows. When the films having three kinds of sizes like this embodiment are prepared, the transfer time of each film (transfer distance) is different due to the different locations of the trays for each film. Therefore, the printing preparation time, which is a sum of the conveying time and the feeding time, is obtained beforehand for each film size. Then, printing preparation time is inputted and stored in the control means 15 as printing preparation time information. When transfer of the image data is started, the print size is recognized based on the print size information sent from the image data outputting apparatus. Then, the printing preparation time of the film having the print size may be obtained from the above-described printing preparation time information.

As described above, when the transfer time and the printing preparation time are obtained, the printing preparation time is subtracted from the transfer time to obtain a difference time, which is a result of the calculation, transfer time−printing preparation time. This is because, generally, the transfer time is longer than the printing preparation time. Then, the printing preparation of the film is started after a period of time equivalent to the difference time has passed from the time that transfer of the image data is started (in this embodiment, when actual transfer of the image data is started after the preparation communication).

Figure 3:
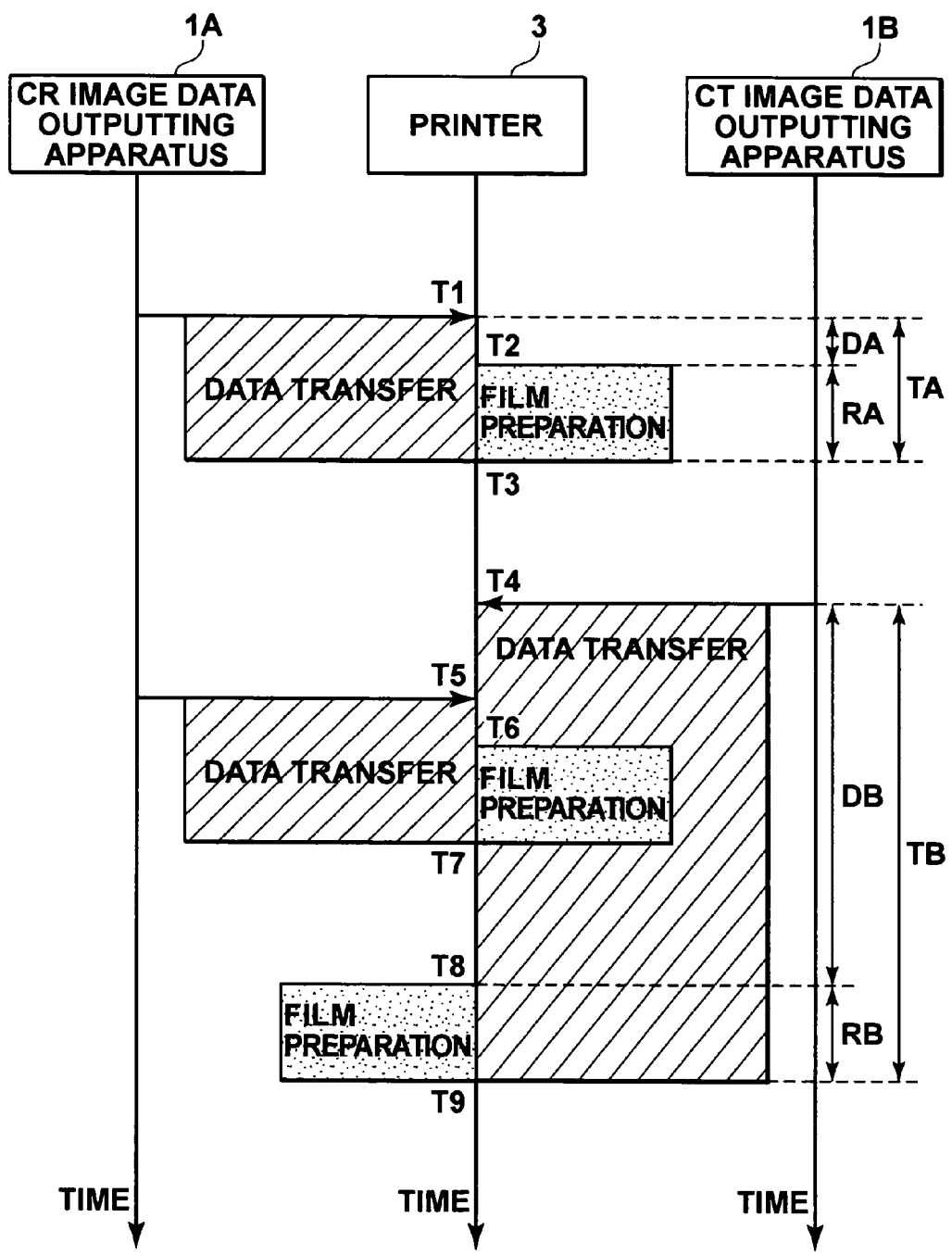
FIG. 3 is a time chart showing a control in a print system according to the present invention.

Specifically, when transfer of the image data from the image data transferring device 1A is started, the control means 15, as shown in a time chart in FIG. 3, receives the image data and stores it in the storage unit 11. Simultaneously, the transfer start time T1 is stored in the control means 15. A transfer time TA and printing preparation time RA are obtained, as described above, based on the information sent from the image data outputting apparatus 1A. Then, difference time DA between the TA and RA (DA=TA−RA) is obtained. Time T2, which is the time after difference time DA has passed from the above transfer start time T1, is obtained, and the feeder 14 is controlled so as to start the printing preparation of the recording sheet at the time T2.

Similarly, in the control means 15, when transfer of the image data from the image data transfer device 1B is started, the image data is received by the control means 15 and stored in the storage unit 11 and transfer start time T4 is also stored. Then, the control means 15 obtains transfer time TB and printing preparation time RB based on the information sent from the image data outputting apparatus 1B, in the same manner as described above, to obtain difference time DB (DB=TB−RB) from the TB and RB. Time T8, which is the time after a period equivalent to the difference time DB has passed since the transfer start time T4, is obtained, and the feeder 14 is controlled so as to start the printing preparation of the recording sheet at the time T8.

The feeder 14 feeds one sheet of film from the tray storing the film having the print size, which is recognized based on the print size information sent from the above preparation communication, and conveys the film to a point before the laser print unit 12, so that the film is prepared to start printing at any time.

The control means 15 controls the storage unit 11 to input the image data stored therein to the laser print unit 12 immediately after the printing preparation of the film and transfer of the image data are completed (T3, T9). Then, the control means 15 controls the storage unit 11 and the laser print unit 12 so that the film is irradiated with laser beams by the laser irradiation section 12A based on the image data, while being conveyed in the laser print unit 12. Thereafter, the film is heated and developed in the heater section 12B.

By controlling the print preparation start timing of the film as described above, the printing preparation of the film is completed when transfer of the image data is completed. Therefore, the image can be printed and observed immediately after transfer of the image data is completed. Accordingly, it becomes possible to immediately observe prints of the images and to observe the prints in the order of the completion of transfer of the image data. This will be specifically explained as follows. For example, in FIG. 3, after transfer of the image data is started from the image data outputting apparatus 1B at the time T4, transfer of the image data from the image data outputting apparatus 1A is started at the time of T5. When transfer is completed at the time T9 in the former, and at the time T7 in the latter, as shown in FIG. 3, the printing preparation of the film for the image data transferred from the image data outputting apparatus 1A is performed first. Therefore, transfer of the image data of the image data outputting apparatus 1B is not awaited enabling printing and observation of the image data of the image data outputting apparatus 1A of which transfer has been previously completed.

In the above embodiments, the completion time of transfer of the image data completely coincides with the completion time of the printing preparation of the film. However, complete matching of the two times is not necessarily required. For example, the printing preparation may be started based on the completion time of transfer of the image data so as to complete the printing preparation of the recording sheet before the transfer completion time by a predetermined time. Alternatively, the printing preparation may be started based on the completion time of transfer of the image data so as to complete the printing preparation of the recording sheet after the transfer completion time by a predetermined time. In the former case, it is possible to start printing immediately after completion of the printing preparation of the recording sheet, while printing is started after awaiting completion of the printing preparation of the recording sheet following the completion of image data transfer in the latter case.

In the above embodiment, the printing preparation time for each print size is directly stored in the control means 15. However, information with which the printing preparation time for each print size can be calculated, for example, the information indicating the positions of the trays storing the films of each size (or the information indicating the film conveying distance from each tray to the laser print unit 12) is stored in the control means 15. Then, with reference to the conveying speed of the film in accordance with the print size, the printing preparation time may be obtained by calculation or the like.

In the above embodiment, the transfer time and the printing preparation time are calculated based on transfer speed, information of size of image and information of the printing size sent from the image data outputting apparatus when the image data has been transferred. However, the transfer time and printing preparation time can be calculated by other methods.

For example, generally, the size of image data and transfer speed are fixed in many cases. In such cases, the transfer time of the image data may be acquired in the following manner. That is, the transfer time of the image data from each image data outputting apparatus is acquired from the size of the image and transfer speed and inputted and stored in the control means 15 beforehand as transfer time information. Then at the start of transfer of image data, the image data outputting apparatus from which the identification information has been sent is identified by the identification information and finally, transfer time of the image data outputting apparatus is obtained by the transfer time information.

In addition, the printing preparation time may be acquired in a similar manner. That is, when the size for printing has been previously determined for each image data outputting apparatus, the printing preparation time is acquired for each of the image data outputting apparatuses and is inputted and stored in the control means 15 as printing preparation time information in advance. Then, at the start of transfer of image data, the image data outputting apparatus, from which the identification information has been sent, is identified by the identification information and finally, the printing preparation time for the image data outputting apparatus is acquired by the printing preparation time information.

Furthermore, the transfer time of the image data according to the present invention may be a period of time required for actually transferring image data, or a period of time capable of being regarded as essentially the same as the time required for actually transferring image data. For example, the time may be a period from the start of the preparation communication to the completion of the transfer, or a period from the start of the actual transfer of the image data to the completion thereof. In addition, the start of the transfer may be the point of time when the transfer of the image data is actually started or the point of time capable of being regarded as essentially the same as the time when the transfer of the image data is actually started. For example, the start of transfer may be the start of the preparation communication or the start of the actual transfer of the image data.

In the above embodiment, two image data outputting apparatuses are connected to a single printer. However, in the print system of the present invention, three or more image data outputting apparatuses may be connected to the printer. For example, four image data outputting apparatuses including image data outputting apparatuses 1C and 1D shown by dotted lines in FIG. 1 may be connected to the printer.

In addition, when there is an apparatus, in which the printing preparation time of the recording sheet is longer than the transfer time of the image data, among a plurality of image data outputting apparatuses, for example, the printing preparation of the recording sheet can be started at the transfer start time of the image data for such an image data outputting apparatus.

Note that in the above print system, in the case where the printing is canceled after starting printing of the film, the film prepared for printing is kept in a preparation state for the next printing. If the next printing is performed with a film of the same size as that which has been prepared, printing is performed by using the film. If the next printing is performed with a film of a different size, the film already prepared is not used, and passes the laser print unit 12 so as to be discharged outside of the printer 3. Or in the latter case, a film stand-by unit, which is not shown, may be disposed at a position between the trays 13A, 13B, and 13C, and the laser print unit 12, that is, on the feeder 14. The film may be moved to the stand-by unit to be in a stand-by state and when image printing of the same print size is performed, the film may be taken out from the film stand-by unit and may be conveyed to the laser print unit 12.

What is claimed is:

1. A print system comprising:
   at least two image data outputting apparatuses and one printer that prints images based on image data transferred from the at least two image data outputting apparatuses; and
   control means that controls printing preparation of the recording sheet in the printer based on the transfer time, required for the transfer of the image data when the image data is transferred from each image data outputting apparatus, and a printing preparation time of printing preparation of the recording sheet for printing the images based on the image data; wherein
   the printer is equipped with a plurality of trays at different positions, each of which houses recording sheets of different sizes;
   printing start time is obtained that enables the time of completion of transfer of the image data and the time of completion of the printing preparation of the recording sheet to be at a substantially same time;
   the printing preparation of the recording sheet is started at the above-described printing start time;
   the at least two image data outputting apparatuses transfer identifying information regarding themselves when transferring the image data;

the printing preparation time for the each image data outputting apparatus is recorded in advance in the control means; and the control means obtains the printing preparation time which corresponds to the identifying information transferred from the at least two image data outputting apparatus, and determines the printing start time based on the printing preparation time and the transfer time.

2. The print system according to claim 1, wherein the control means calculates and obtains the transfer time based on information sent from the image data outputting apparatus when the image data is transferred from each image data outputting apparatus.

3. The print system according to claim 2, wherein:

the control means obtains a difference time between the transfer time and the printing preparation time; and when the transfer time is longer than the printing preparation time, the printing preparation of the recording sheet is staffed after a period of time equivalent to the difference time has passed from a transfer start time of the image data.

4. The print system according to claim 1, wherein:

transfer time information indicating the transfer time of the image data of the image data oputputting apparatus is input and stored in the control means in advance.

5. The print system according to claim 4, wherein:

the control means obtains a difference time between the transfer time and the printing preparation of the recording sheet when the transfer time is longer than the printing preparation time, the printing preparation of the recording sheet is staffed after a period of time equivalent to the difference time has passed from a transfer staff time of the image data.

6. The print system according to claim 1, wherein:

the control means obtains a difference time between the transfer time and the printing preparation time; and when the transfer time is longer than the printing preparation time, the printing preparation of the recording sheet is staffed after a period of time equivalent to the difference time has passed from a transfer staff time of the image data.

* * * * *